W. PARKES.
MECHANISM FOR FEEDING FILMS
APPLICATION FILED DEC. 19, 1917.
1,352,144.
Patented Sept. 7, 1920.
3 SHEETS—SHEET 1.
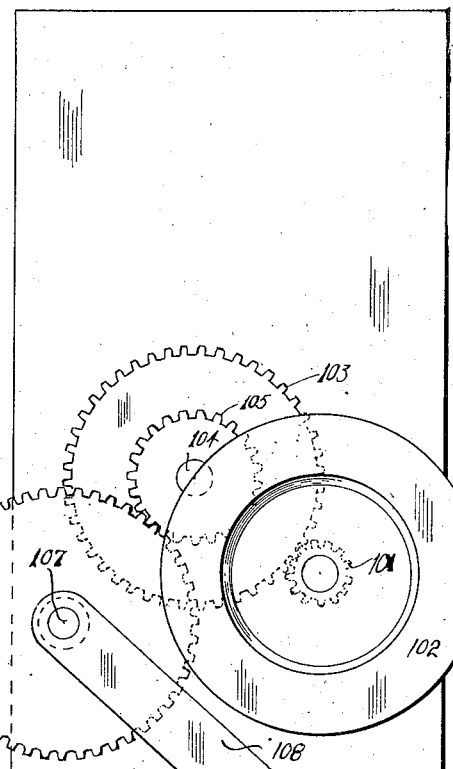
FIG.11.
FIG.2.
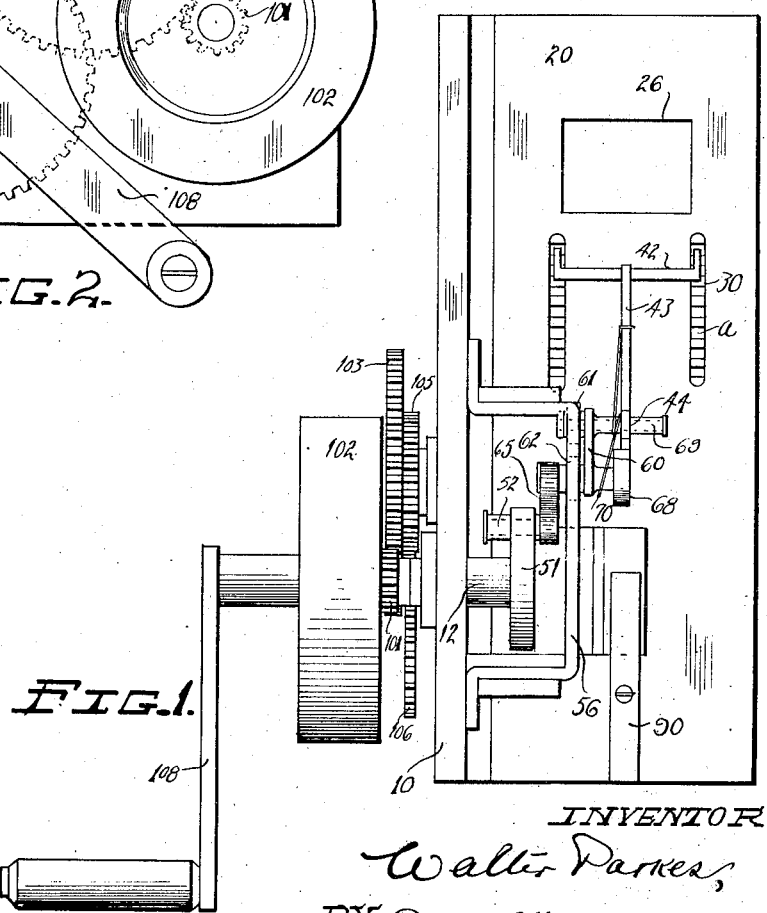
FIG.1.
INVENTOR
Walter Parkes,
BY Baker & Macklin, ATTYS.

W. PARKES.
MECHANISM FOR FEEDING FILMS.
APPLICATION FILED DEC. 19, 1917.
1,352,144.
Patented Sept. 7, 1920.
3 SHEETS—SHEET 2.
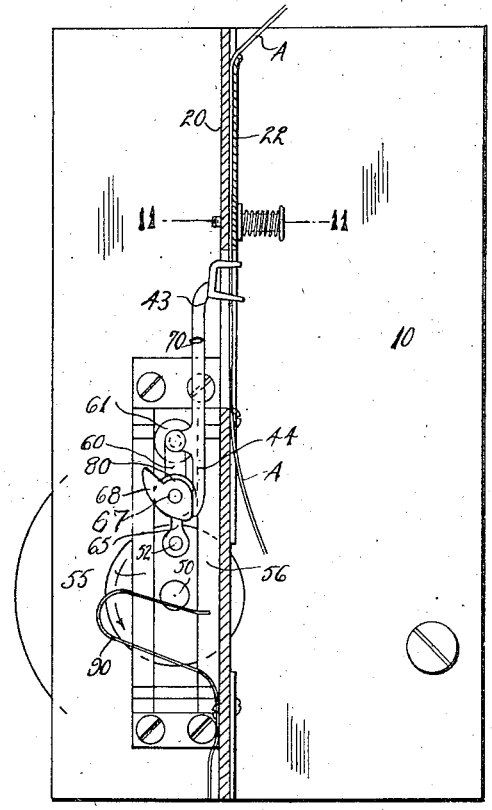
FIG. 3.
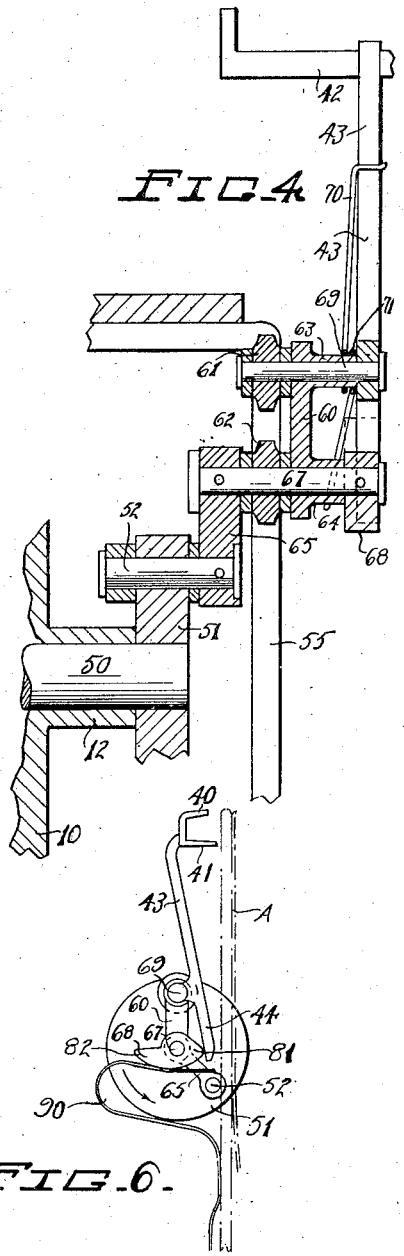
FIG. 4.
FIG. 5.
FIG. 6.
INVENTOR,
Walter Parkes,
BY Baker & Macklin
ATT'YS.

W. PARKES.
MECHANISM FOR FEEDING FILMS.
APPLICATION FILED DEC. 19, 1917.
1,352,144.
Patented Sept. 7, 1920.
3 SHEETS—SHEET 3.
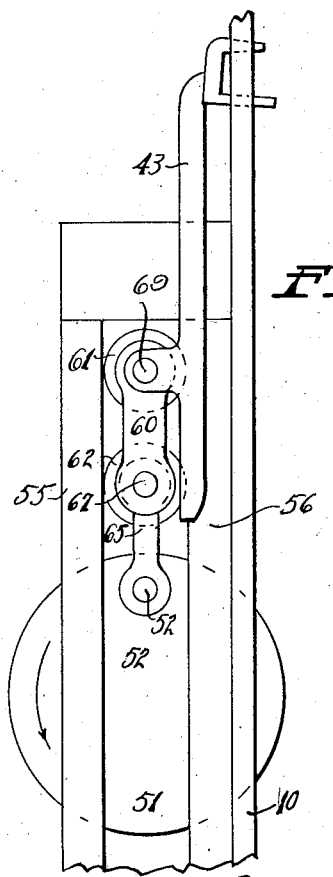
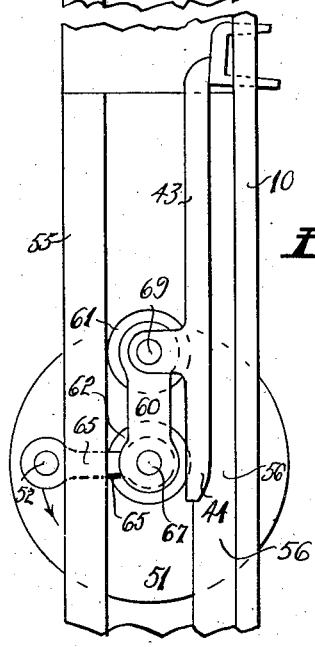
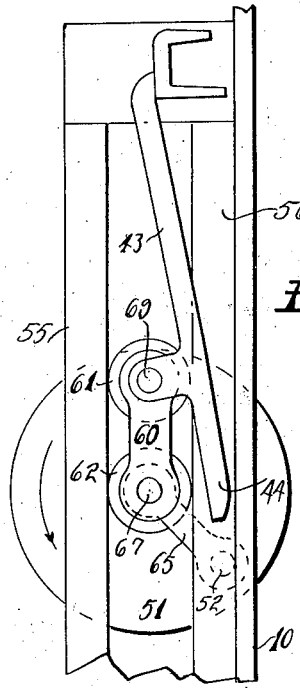
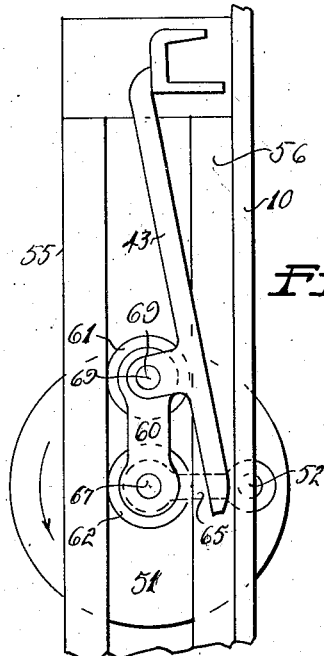
INVENTOR,
Walter Parkes,
BY Baker Moeklin, ATT'YS.

UNITED STATES PATENT OFFICE.

WALTER PARKES, OF CLEVELAND, OHIO, ASSIGNOR, BY MESNE ASSIGNMENTS, TO HENRY C. OSBORN, OF CLEVELAND, OHIO.

MECHANISM FOR FEEDING FILMS.

1,352,144. Specification of Letters Patent. Patented Sept. 7, 1920.

Application filed December 19, 1917. Serial No. 207,974.

*To all whom it may concern:*

Be it known that I, WALTER PARKES, a citizen of the United States, residing at Cleveland, in the county of Cuyahoga and State of Ohio, have invented a certain new and useful Improvement in Mechanism for Feeding Films, of which the following is a full, clear, and exact description, reference being had to the accompanying drawings.

This invention relates to mechanism for feeding film, in a motion picture apparatus—either in the camera or in the projector. One of the objects of my invention is to provide mechanism for this purpose which shall be simple in construction, easily operable and be durable and not liable to get out of order, and which shall positively engage the film and withdraw from it without danger of tearing, and shall be able to automatically enter the holes of the film, irrespective of the position of the film at the time the engagement starts.

Another object of the invention is to provide an intermittent feed, in which, in each cycle of movement, the period of rest of the film shall materially exceed the period of movement. By thus reducing the time of changing and lengthening the time of exposure or observation for each view, I obtain more detail in the photograph and a more luminous projection of it.

In accomplishing the above results, I have provided means for guiding the film and a bodily moving and swinging member which enters the holes of the film and which then travels substantially parallel with the film guide, and then at the end of the travel, quickly swings out of the film. This reciprocating and swinging member is suitably guided and is operated by a very simple crank and cam mechanism, which gives the entire feeding of the film material less than half the rotation of the crank pin, allowing materially more than half for the exposure. Theoretically, I use one quarter of the rotation for the movement of the film and three quarters for the exposure, though this proportion may be reduced somewhat due to looseness of the parts in actual operation. To assist the mechanism from the dead center (as hereinafter fully explained) I prefer to provide a spring which is constrained after the feeding movement of the film and which acts to assist the mechanism on the return movement of the feeding claw. This spring also operates to take up looseness of the parts.

A preferred embodiment of my invention is illustrated in the drawings hereof, and is hereinafter more fully described, and the essential characteristics of the invention are summarized in the claims.

In the drawings, Figure 1 is a front elevation of a film feeding mechanism embodying my invention; Fig. 2 is a side elevation of the same looking at the driving side; Fig. 3 is a sectional side elevation from the opposite side of the device; Fig. 4 is an axial section from the crank and cam mechanism, being a vertical section with the parts as shown in Fig. 3; Figs. 5 and 6 are details of the feeding device in side elevation, Fig. 5 showing the film engaging member in its lowermost position just before it leaves the film, and Fig. 6 showing it after it has left the film and before it starts to rise, the topmost position of this member being shown in Fig. 3; Figs. 7 to 10 inclusive are somewhat diagrammatic enlarged side elevations, showing the film feeding claw carried in the crank in various positions, Fig. 7 being the highest position and in engagement, Fig. 8 the lowest position still in engagement, Fig. 9 one of the lowest positions where the claw has been disengaged from the film, and Fig. 10 the lowest position where the carriage is just about to rise. The cam which operates the claw is omitted in these views for simplicity of illustration. Fig. 11 is a detail of the pressure device for the film gate in horizontal section, as indicated by the line 11—11 on Fig. 3.

The structure shown in the drawings may conveniently be considered as consisting of a film guiding device, a film feeding device, a driving mechanism for the latter device, and a suitable frame carrying the three parts mentioned. The form of the frame will of course vary according to the use for which the mechanism is designed. As shown, the frame consists primarily of a vertical plate 10.

The film guiding device is carried by the frame plate 10 and, as shown in the drawings, consists of a vertical plate 20, secured at one edge to the plate 10, and a plate 22, spring pressed against the plate 20. The film designated A slides between the plates 20 and 22. The plate 20 is shown as provided with a suitable opening 26 for exposing or exhibiting the film.

Referring more particularly to Fig. 11, it will be seen that the plate 20 is recessed to receive the film A. The central portion of the recess is made deeper as indicated at 24 to entirely clear the film, so that the film lies against ribs 25 and 25 formed by the shallower portions of the recess. The body of the plate 20 forms edge walls at the outer edges of the ribs 25 and guides the film laterally.

This spring pressing of the plate 22 is conveniently accomplished, as shown, by securing a cross bar 27 to the plate which overlaps its edges, and mounting screw studs 28 in the plate 20, which project through openings in the bar 27, compression springs 29 surrounding the screw studs and being compressed between their heads and the bar 27. This is a simple construction and keeps the plate 22 spring pressed against the plate 20 in the recess 24. This effectively guides the film. The construction however allows the plate 22 to give back if necessary, as when the film feeding device strikes against an imperforate portion of the film. This will be explained hereinafter.

The stationary film guiding plate 20 is provided with a pair of parallel slots 30 which register with the usual rows of openings $a$ in the film A, as guided in the recess of the plate 20. The film feeding device acts through these slots 30 and engages the openings $a$ of the film and then moves downwardly in the slots 30, thereby feeding the film. The film A is engaged through the slots 30 by prongs 40 and 41 projecting from the ends of a cross bar 42 which is rigidly carried by an actuating lever 43.

The mechanism for operating the lever 43 to cause it to reciprocate parallel with the film and to swing into and out of engagement with it will now be described. Formed on the plate 10 is a suitable hub 12 forming a bearing for the crank shaft 50. On this shaft is a crank 51, preferably a disk crank, carrying a crank pin 52. Suitably mounted on the plate 10 is a slideway or guide comprising two parallel bars 55 and 56 connected at their ends and secured to the plate 10. 60 indicates a carriage having a pair of rollers 61 and 62 guided between the bars 55 and 56. This carriage is connected by a link 65 with the crank pin 52. This link is also a rock arm on the pin 67, which is freely journaled in the carriage 60 and which also forms a journal for the roller 62. On the outer portion of this rock pin 67 is a cam 68 which acts against the lower end of the lever 43, this lever being intermediately pivoted on the pin 69. The pin 69 also forms a journal for the roller 61.

It results from the construction described, that, as the crank is rotated, the pin 52 acting through the connecting link 65 reciprocates the carriage 60 in a straight line parallel with the film. At the same time, the rock shaft 67 turns the cam 68 back and forth and thereby rocks the lever 43. The cam is so formed that the rocking occurs at the upper and lower ends of the reciprocation of the lever to cause the prongs to engage and withdraw from the film respectively. The cam is formed to shove against the lower end of the lever, which operates positively to withdraw the upper end. The entering movement is effected by a spring 70 which acts as permitted by the cam. This spring is shown as a wire bearing at its free upper end against the rear edge of the lever 43 and coiled at 71 about the hub 63 of the carriage and anchored at its lower end by bearing against the hub 64 in which the rock pin 67 is journaled.

A more detailed description of the operation of the crank and cam mechanism will now be given with reference to Figs. 3, and 5 to 10 inclusive. Figs. 3 and 7 show the mechanism after the prongs have come into engagement with the film, but with the parts in substantially their highest position. Now, as the crank continues to rotate in the direction of the arrows, the crank pin travels toward the left and downwardly for a quarter of a revolution, thus bringing the carriage to its lowermost position. During this movement a concentric portion 80 of the cam 68 is traveling past the lower end 44 of the lever so that the lever is not rocked, but is held in its upright position. The parts are now in the position shown in Fig. 8.

As the crank pin continues its travel in the lower left hand quarter of its course, the axis of the rock shaft 67 remains stationary in alinement with the crank shaft, and, as the crank pin travels, the rock arm 65 rocks the shaft 67, turning the cam 68 in the opposite direction to that above described. At about the position indicated by Fig. 5, the toe 81 of the cam begins to act on the lower end 44 of the lever 43. The result of this is that as the crank pin travels into the lower right hand quarter of its rotation, the toe 81 is forced against the lower end 44 of the lever, and swings the upper end out of engagement with the film. This position is indicated in Figs. 6 and 9.

Now, when the crank pin reaches the beginning of the upper right hand quarter of the rotation, as shown in Fig. 10, the link 65 starts to shove up on the pin 67 and the carriage 60, and accordingly, the carriage and lever 43 are elevated with the claw out of engagement with the film. The cam toe 81 is formed to hold the lever out of engagement with the film until the crank pin reaches the upper portion of the rotation. As the crank pin approaches the topmost position, traveling in the upper right hand quarter of the rotation, it swings the toe 81 of the cam away from the lever so that the spring 70 forces the prongs of the lever into engagement with the film just as the carriage and lever come into their uppermost position, as shown in Figs. 3 and 7.

It will be seen that the angle at which the link 65 is drawing down the carriage increases from "0" to "90" degrees at the bottom of the stroke of the carriage. The lower portion of this stroke, after the angle of pull becomes so great as to be ineffective, is accomplished by the momentum of the parts.

To properly cause the carriage to start on its upward stroke, when the link 65 is in the diametrically opposite position, I provide the spring 90. This spring is secured to the plate 20 and has its free portion standing adjacent to the axis of the crank. As the carriage comes into its lowermost position the cam 68 engages the spring 90 and may slightly constrain it. In the third quarter of the rotation, a toe 82 on the cam 68 presses downwardly on the spring 90 and constrains it, so that it is able to react upwardly on the carriage to start the elevation thereof as the crank pin passes the horizontal diametric plane and gives the pin 67 a chance to rise. After the spring has raised the rock pin 67 above the dead center, the continued rotation of the crank pin shoves upwardly on the pin 67 to shove up the carriage. The spring 90 accordingly assists the carriage from the dead center. It also provides a cushion as it comes into that position. The spring likewise takes up any back lash or looseness at the journals of the crank pin and link.

It will be seen from the above that a uniform rotation of the crank shaft moves the carrier from an upper position of rest downwardly for about a quarter of a rotation of the crank, and then leaves it standing in this position for about a half rotation, during which time the prong carrier is swung free from the film, then during the remaining quarter of a rotation raises the prong carrier and swings it into engagement with the film. The result is that the feeding of the film covers about one-quarter rotation of the crank, the film for the remaining three-quarters being stationary. This gives a comparatively rapid feeding of the film and a comparatively long exposure of it, which has been found a great advantage in operation. For instance, in taking the picture, the longer exposure allows a smaller diaphragm-opening to be used, giving more detail to the photograph. When used in a projecting machine, greater luminosity is obtained, and the mechanism enables the projection to be made without the employment of a shutter, if desired. The engagement of the film by the prongs and the release of the prongs from the film are easy and gradual, and jerking or tearing of the film is avoided.

To avoid the necessity of accurately positioning the film when it is placed in the guide, so that the prongs will necessarily enter the holes thereof, and to prevent damage if the prongs strike the space between the holes, I provide the spring pressed plate 22 of the film guide, already explained, which is adapted to give backward away from the stationary plate 20. To allow the prongs themselves to give backward under this condition, I make the cam act positively only to withdraw the prongs, their entering movement being caused by the spring 70. Normally the spring serves to maintain the lower end 44 of the lever 43 in engagement with the cam, but when the prongs strike a portion of the film between holes the prongs may simply give backwardly and slide along the film.

The described provision for backward movement of the prongs, together with the provision for moving the plate 22 in the opposite direction, entirely prevents any danger to the film from the prongs striking at other points than in registration with the holes, for when the prongs do strike between holes they simply slide along the film as they move downwardly and spring in the next holes.

It results from the spring relieving features described that it is unnecessary to thread the film into any definite position to cause it to be fed. Film is simply pushed into the space between the plates 20 and 22 and the prongs automatically come into engagement with it, whether they at first register with it or not. Furthermore it is not necessary to stop the feeding mechanism to insert the film. This is of importance in an exhibiting machine when the film breaks or it is desired to use a new reel. The feeding mechanism may simply continue its operation, by a motor or by hand, and the fresh film be put into place and be automatically engaged by the feeding prongs. It results from the spring relieving features of my mechanism that in case the film catches above or below, or sticks to one of the reels, the stoppage does not cause the claw to tear the film, but the claw simply gives backward out of the film and slides idly across the space in the openings a.

In addition to the important feature of my mechanism that the feeding occupies only about one quarter of a rotation of the crank 51 is the further important feature that during a large part of the idle half rotation of the crank, the film is locked by engagement therewith of the claw in its down position. It will be seen from the diagrams that the film is thus locked from the position shown in Fig. 8 until about the position shown in Figs. 9 and 6. This is of great advantage as it locks the film at the end of its movement and holds it stationary until the claw is about ready to rise. This locking prevents any dislocation by momentum.

It should be noticed particularly that my feeding mechanism while being very simple in construction provides the desired quick feed and long rest by mechanism which is constantly connected. This avoids the uncertainty of escapements or other mechanisms where the driver is disconnected from the claw.

Any suitable mechanism may be employed for giving a uniform rotation to the crank shaft 50. The hand driving mechanism I have shown is illustrative of any convenient driving mechanism, though I have found the particular mechanism shown to be very satisfactory, in use. As shown, the shaft 50 is journaled in a bearing 12 rigid with the plate 10. On the other side of the plate this shaft carries a pinion 101, and, beyond the pinion, a comparatively heavy disk or fly wheel 102. Meshing with the pinion 101 is a gear 103 journaled on a stationary stud 104 and having rigid with it a smaller gear 105. The smaller gear is shown as meshing with the gear 106 which is journaled on the stationary stud 107. A hand crank 108 is shown as rigid with the gear 106, for the purpose of driving it.

Having thus described my invention, what I claim is:

1. In a device of the character described, the combination with a film guide, of intermittent feeding mechanism therefor constantly connected together and providing a time interval of rest for the film exceeding the time interval of progression thereof, and the film being locked stationary by a part of the feeding mechanism following its period of progress, whereby inadvertent continuance of movement due to momentum is avoided.

2. The combination of a film guide, a continuous driver, an intermittent feed and constantly connected mechanism between the driver and intermittent feed adapted to give to the film alternate periods of rest and progress, the periods of rest exceeding in time the periods of progress, and the film being locked stationary during a portion only of its rest period immediately following the conclusion of its period of progress, thereby preventing overthrow due to momentum.

3. The combination of a film guide, a reciprocatory film engaging member, a rotary driving device for said member, and connecting mechanism between said driving device and member adapted to give the member its full active stroke on less than half the rotation of the driving device, and utilize the remainder of said rotation in locking the film stationary and in returning said member to initial position.

4. The combination of a film engaging claw, a revoluble crank, connecting mechanism between the crank and claw adapted to move the claw actively for about one quarter of the rotation of the crank and to hold it stationary in engagement with the film and then swing the claw and move it non-actively all within about the remaining three quarters of the movement of the crank.

5. The combination of a reciprocating carriage, a claw pivoted thereto, a rock shaft carried by the carriage, a cam on the rock shaft adapted to swing the claw, an operating crank, and a connection between the crank and rock shaft.

6. The combination of a reciprocating carriage, a claw pivoted thereto, a rock shaft mounted in the carriage, a cam on the rock shaft adapted to engage the claw, a rock arm on the rock shaft, and a crank to which the rock arm is pivoted.

7. The combination of a film guide, a guideway parallel therewith, a carriage slidably mounted in the guideway, a film engaging member pivoted to the carriage, a rock shaft mounted on the carriage, a cam on the rock shaft engaging the film engaging member, a crank, and a rock arm on the rock shaft pivoted to the crank.

8. The combination of a film guide, a pair of guide bars parallel therewith, a carriage having a pair of rollers located between the guide bars and guided thereby, a claw member pivoted to the carriage, a rock shaft mounted in the carriage, a cam on the rock shaft engaging the claw member, a crank pin, and a rock arm on the rock shaft pivoted to the crank pin.

9. The combination of a film guide, a pair of guide bars parallel therewith, a carriage having a pair of rollers located between the guide bars and guided thereby, a claw member pivoted to the carriage, a rock shaft mounted in the carriage, a cam on the rock shaft engaging the claw member, the pivot pin of the claw member and said rock shaft providing journal bearings for the two guide rollers, and mechanism for reciprocating the carriage and swinging the rock shaft.

10. The combination of a film guide, a carriage, mechanism for guiding it substantially parallel with the film guide, a claw member pivoted to the carriage, a rock shaft mounted in the carriage, a cam on the rock shaft engaging the claw member, and mechanism for reciprocating the carriage and swinging the rock shaft.

11. The combination of a film guide, a carriage, mechanism for guiding it substantially parallel with the film guide, a claw member pivoted to the carriage, a rock shaft mounted in the carriage, a cam on the rock shaft engaging the claw member, a rock arm on the rock shaft, and a driving crank having a crank pin to which the rock arm is pivoted.

12. The combination of a film guide, a reciprocating and swinging film engaging member, a crank, mechanism connecting the crank with the film engaging member and adapted to reciprocate and swing the film engaging member as the crank travels, and a spring serving to assist said mechanism from the dead center.

13. The combination of a reciprocating carriage, a film engaging member pivoted thereto, a cam pivoted to the carriage and adapted to actuate the film engaging member, a crank having its crank pin connected with the cam, and a spring adapted to assist said mechanism from the dead center.

14. The combination of a reciprocating carriage, a claw member pivoted thereto, a cam pivoted to the carriage and adapted to engage the claw member, a crank, mechanism connecting the crank with the cam, and a spring adapted to be constrained by the cam and assist the mechanism from the dead center.

15. The combination of a reciprocating carriage, a claw member pivoted thereto, a rocking cam pivotally mounted on the carriage, a crank, an arm rigid with the cam and pivoted to the crank, the distance between the pivot of the cam and the axis of the crank pin being substantially equal to the radius of the crank pin's movement, and a spring adapted to move the pivot of the cam from alinement with the axis of the crank when the position of said arm allows it.

16. The combination of a reciprocating carriage, a claw member pivoted thereto, a rock shaft mounted in the carriage, a cam on the rock shaft adapted to engage the claw member, a rock arm on the rock shaft, a crank having a crank pin to which the rock arm is pivoted, the length of said rock arm between its axis of revolution and the axis of the crank pin being substantially equal to the radius of the crank pin's movement, a spring adapted to be engaged by the cam about the time the crank has made a quarter turn, said cam having a portion adapted to constrain the spring during the succeeding part of the crank's movement.

17. The combination of a reciprocating carriage, a claw member pivoted thereto, a rocking cam pivotally mounted on the carriage, a crank, an arm rigid with the cam and pivoted to the crank, the distance between the pivot of the cam and the axis of the crank pin being substantially equal to the radius of the crank pin's movement.

18. The combination of a reciprocating carriage, a claw member pivoted thereto, a rock shaft mounted in the carriage, a cam on the rock shaft adapted to engage the claw member, a rock arm on the rock shaft, a crank having a crank pin to which the rock arm is pivoted, the length of said rock arm between its axis of revolution and the axis of the crank pin being substantially equal to the radius of the crank pin's movement.

19. The combination of a reciprocating carriage, a claw pivoted thereto, a rock shaft carried by the carriage, a cam on the rock shaft adapted to swing the claw, and means for turning the rock shaft and bodily shifting the carriage.

In testimony whereof I hereunto affix my signature.

WALTER PARKES.